（12）United States Patent
Shen et al.

(10) Patent No.: US 8,489,117 B2
(45) Date of Patent: Jul. 16, 2013

(54) REAL-TIME LOCATION ESTIMATION OF A MOBILE STATION IN A WIRELESS COMMUNICATION SYSTEM

(75) Inventors: XiaoHui Shen, Mundelein, IL (US); Hong-Lei Liu, Beijing (CN); Kwok Lam Cheung, Beijing (CN); Sheng-Yu Hu, Beijing (CN)

(73) Assignee: Motorola Mobility LLC, Libertyville, IL (US)

( * ) Notice: Subject to any disclaimer, the term of this patent is extended or adjusted under 35 U.S.C. 154(b) by 0 days.

(21) Appl. No.: 13/522,726

(22) PCT Filed: Jan. 27, 2010

(86) PCT No.: PCT/CN2010/000121
§ 371 (c)(1),
(2), (4) Date: Jul. 18, 2012

(87) PCT Pub. No.: WO2011/091549
PCT Pub. Date: Aug. 4, 2011

(65) Prior Publication Data
US 2012/0322460 A1  Dec. 20, 2012

(51) Int. Cl.
*H04W 24/00* (2009.01)
(52) U.S. Cl.
USPC ............. 455/456.1; 455/186.1; 455/440; 342/118; 342/27; 342/146
(58) Field of Classification Search
USPC ............. 455/456.1–456.3; 342/450–465
See application file for complete search history.

(56) References Cited

U.S. PATENT DOCUMENTS

| | | | |
|---|---|---|---|
| 6,263,208 B1 * | 7/2001 | Chang et al. | 455/456.3 |
| 6,269,246 B1 * | 7/2001 | Rao et al. | 455/456.3 |
| 6,393,294 B1 * | 5/2002 | Perez-Breva et al. | 455/456.5 |
| 7,299,059 B2 | 11/2007 | Misikangas et al. | |

(Continued)

FOREIGN PATENT DOCUMENTS
WO  2008053208 A1  5/2008

OTHER PUBLICATIONS

Huynh Quan Hieu, Vu Dinh Thanh, "Ground Mobile Target Tracking by Hidden Markov Model", Nov. 13, 2006, Science & Technology Development, vol. 19, No. 12—2006, all pages.

(Continued)

*Primary Examiner* — Marcos Batista
*Assistant Examiner* — Keith Fang

(57) ABSTRACT

An apparatus and method is provided for real-time location estimation of a mobile station (MS) on a map of roads using non-Global Positioning Satellite location data (300) of the MS and includes a step of determining (302) a mobility of the MS. A next step (306) includes identifying a region that covers all location data. A next step (310) includes dividing the region into smaller blocks, where each block constitutes a Hidden Markov Model state. A next step (312) includes determining a distance between blocks, to be used in a varied continuous probability distribution to determining a state transition probability of each block to represent a likelihood of the MS moving to any one block. A next step (314) includes using a univariate continuous distribution as a function of a distance between each block and a raw location data. A next step (316) includes finding a most likely state/block sequence of the MS motion using the HMM state transition probability and the univariate continuous distribution as the location of the MS.

12 Claims, 7 Drawing Sheets

U.S. PATENT DOCUMENTS

| | | | |
|---|---|---|---|
| 7,948,430 B2* | 5/2011 | Konishi et al. | 342/27 |
| 2005/0131635 A1* | 6/2005 | Myllymaki et al. | 701/205 |
| 2005/0136944 A1* | 6/2005 | Misikangas et al. | 455/456.1 |
| 2011/0070863 A1 | 3/2011 | Ma et al. | |

OTHER PUBLICATIONS

Stefen Mangold, Sofoklis Kyriazakos, "Applying Pattern Recognition Techniques based on Hidden Markov Models for Vehicular Position Location in Cellular Networks", Vehicular Technology Conference, 1999, VTC 1999—Fall, IEEE VTS 50th, all pages.

Nuno-Barrau, Galo et al.: "A New Location Estimation System for Wireless Networks Based on Linear Discriminant Functions and Hidden Markov Models", Hindawi Publishing Corporation, EURASIP Journal on Applied Signal Processing, vol. 2006, Article ID 68154, pp. 1-17, DOI 10.1155/ASP/20006/68154.

Krumm, John: "Probabilistic Inferencing for Location", 2003 Workshop on Location-Aware Computing (Part of UbiComp 2003), Oct. 12, 2003, Seattle, WA, USA, all pages.

Kontikanen, Petri et al.: "Chapter 11—Probabilistic Methods for Location Estimation in Wireless Networks", In: Emerging Locatin Aware Broadband Wireless Adhoc Networks, edited by Rajamani Ganesh, Sastri Kota, Kaveh Pahlavan and Ramon Agusti, Kluwer Academic Publishers, 2004, publication date: Oct. 6, 2004,all pages.

* cited by examiner

REAL-TIME LOCATION ESTIMATION OF A MOBILE STATION IN A WIRELESS COMMUNICATION SYSTEM

FIELD OF THE INVENTION

The present invention relates generally to wireless communication systems and, in particular, to determining a location of a mobile station in a wireless communication system.

BACKGROUND OF THE INVENTION

Knowing an accurate location of mobile station (MS) can benefit network operators in many ways. For example, a continuously mobile MS may indicate that a subscriber is driving, and thus a location of the subscriber can be narrowed down to a nearby road if combined with a map. By way of another example, knowledge of a location of an MS may be used to determine the kind of value-added services to provide to the MS, such as which local advertisements to push to the MS. Recent years have seen a tremendous growth of interest in location-based services. Knowing the location of subscribers can help carriers team up with local businesses to provide instant mobile business information. In addition, statistics of subscribers' location information can help network operators better understand their network traffic distribution and thus allow the operators to better design and deploy their base stations, identify coverage holes, and minimize traffic loss.

Although an MS equipped with a Global Positioning Satellite (GPS) system can provide very accurate location information, there are many limitations preventing network operators from benefiting from GPS enabled devices. First, it may take years for every mobile device to include a GPS device, especially for emerging markets. Second, GPS information is not available in an indoor environment. And third, operators may not be able to obtain GPS information from subscribers due to privacy issues. Other location methods, such as correlating received signal strength and distance from a receiver, are far from accurate. As a result, use of location-based methods for mobility determination is not a good choice for operators at this time.

Therefore, a need exists for an improved method and apparatus for more accurately determining a real-time location of an MS without changing the components of existing infrastructure or depending on enhanced MS capabilities.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION OF THE INVENTION

The present invention provides an improved method and apparatus for more accurately determining a real-time location of an MS without changing the components of existing infrastructure or depending on enhanced MS capabilities. In particular, a communication system is provided that includes a network entity that is able to generate non-GPS raw location data of a mobile station (MS) and has the ability to determine a mobility of the MS, using techniques known in the art such as, for example, the network entity can determine an MS's change in signal strength to determine a mobility of the MS. Time of arrival technique could also be used, as are known in the art. The present invention utilizes different location improvement algorithms on the raw location data depending on whether the MS is moving or stationary. Specifically, if the MS is moving the present invention uses an improved fast Hidden Markov Model (HMM) to improve raw location estimates in real-time, and if the MS is stationary the present invention uses a novel move-and-merge technique to remove noisy location estimates/outliers, as will be detailed below.

Figure 1:
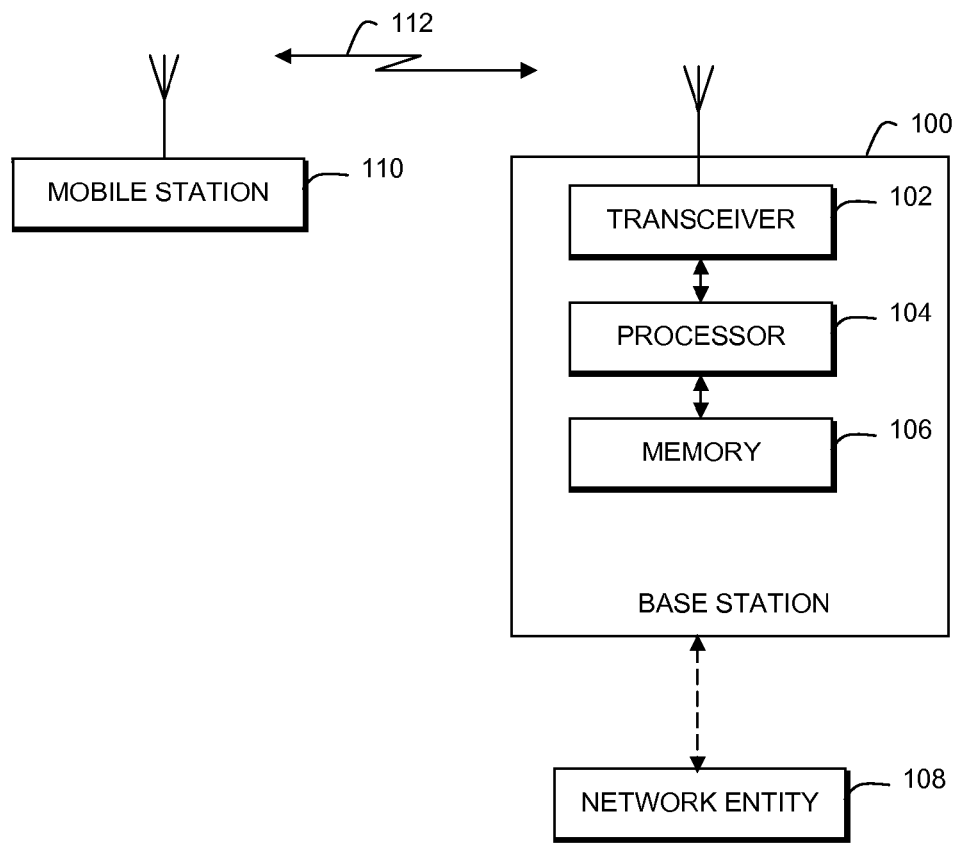
FIG. 1 is a block diagram of a wireless communication system in accordance with the present invention.

The present invention may be more fully described with reference to FIGS. 1-7. FIG. 1 is a block diagram of a wireless communication system in accordance with an embodiment of the present invention. The communication system includes at least one mobile station (MS) 110, such as but not limited to a cellular telephone, a radio telephone, a personal digital assistant (PDA) with radio frequency (RF) capabilities, or a wireless modem that provides RF access to digital terminal equipment (DTE) such as a laptop computer. The communication system further includes at least one network entity 100 such as a base station (BS), NodeB, or Access Point that provides wireless communication services 112 to MS 110. The present invention can be embodied in the base station 100 or other network entity 108 such as a Radio Access Network, Base Station Controller, Radio Network Controller, or a Mobile Switching Center that is in communication the base station 100.

Each BS 100 provides communications services to mobile stations located in a coverage area, such as a cell or a sector of a cell, serviced by the BS via a respective air interface 112, as is known in the art. The network entity 100 (and/or 108) includes a processor 104, such as one or more microprocessors, microcontrollers, digital signal processors (DSPs), combinations thereof or such other devices known to those having ordinary skill in the art. The network entity further includes a memory device 106 associated with the processor, such as random access memory (RAM), dynamic random access memory (DRAM), and/or read only memory (ROM) or equivalents thereof, that store data and programs that may be executed by the respective processor and allow the processor to operate in communication system. The network entity 100 (and/or 108) includes a transceiver 102 associated with the processor.

The embodiments of the present invention preferably are implemented within processor 104, and more particularly with or in software programs and instructions stored in the memory device 106, and executed by the processor 104. However, one of ordinary skill in the art realizes that the embodiments of the present invention alternatively may be implemented in hardware, for example, integrated circuits (ICs), application specific integrated circuits (ASICs), and the like, such as ASICs implemented in the network entity. Based on the present disclosure, one skilled in the art will be readily capable of producing and implementing such software and/or hardware without undo experimentation.

Preferably, communication system is a Global System for Mobile communications (GSM) communication system, or a later generation GSM system, that operates in accordance with the GSM, or later generation GSM such as 3GPP (Third Generation Partnership Project), standards, which specify wireless telecommunications system operating protocols, including radio system parameters and call processing procedures. However, those who are of ordinary skill in the art realize that communication system may operate in accordance with any wireless telecommunication system, such as but not limited to a Code Division Multiple Access (CDMA) communication system or later generation CDMA communication system, a Time Division Multiple Access (TDMA) communication system, a Frequency Division Multiple Access (FDMA) communication system, or an Orthogonal Frequency Division Multiple Access (OFDM) communication system, such as a Worldwide Interoperability for Microwave Access (WiMAX) communication system that operates in accordance with the IEEE (Institute of Electrical and Electronics Engineers) 802.16 standards, a Wireless Local Area Network (WLAN) communication system as described by the IEEE 802.xx standards, for example, the 802.11a/HiperLAN2, 802.11g, or 802.20 standards, or any of multiple proposed ultrawideband (UWB) communication systems.

Figure 2:
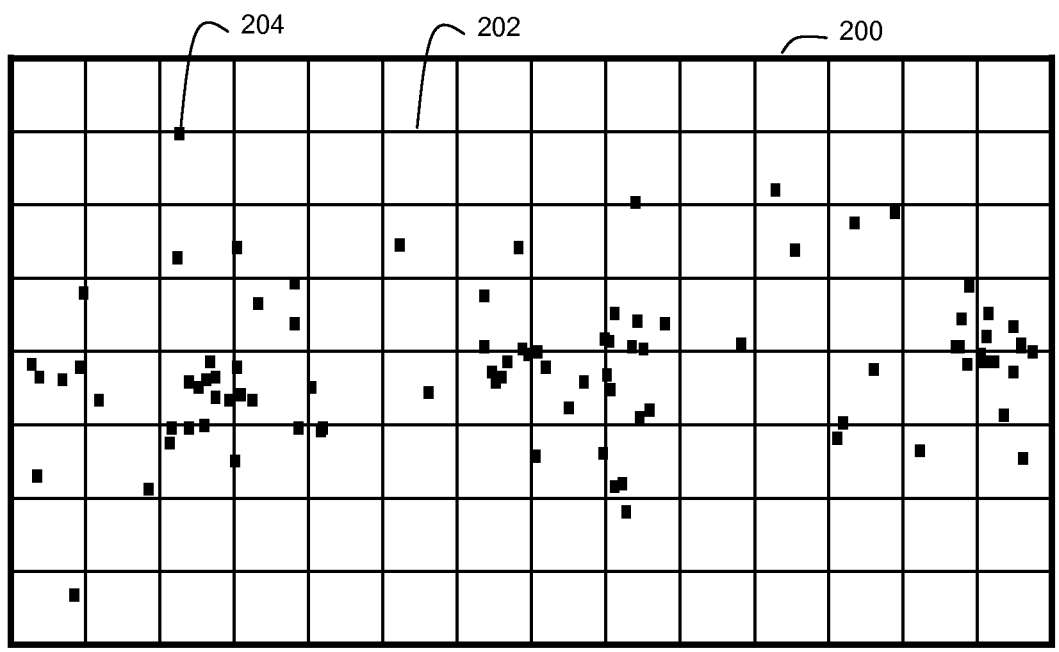
FIG. 2 is a graphical representation of a geographic map of roads and prior art location estimates of a moving MS on a first route.

FIG. 2 shows a representative example of a geographic grid 200 of roads 202 overlain with raw location data 204 of a moving MS. Although a regular array of straight roads is shown in this example, the present invention is also applicable to irregularly shaped roads and blocks, i.e. the block size and shape can vary. The regular grid is only used for ease of demonstration. The raw location data and the mobility of the MS are determined using non-GPS techniques known in the art. In this example, the MS is moving from left to right through the center of the grid array. As can be seen, the existing non-GPS techniques do not accurately represent the linear movement of the MS. Although it is known that all of these locations are on the road if we know MT is moving, it is still very difficult to determine the actual road on which the subscriber is driving due to the large variance of raw location data. This current accuracy is unsatisfactory for providing location-based services to the MS.

Figure 3:
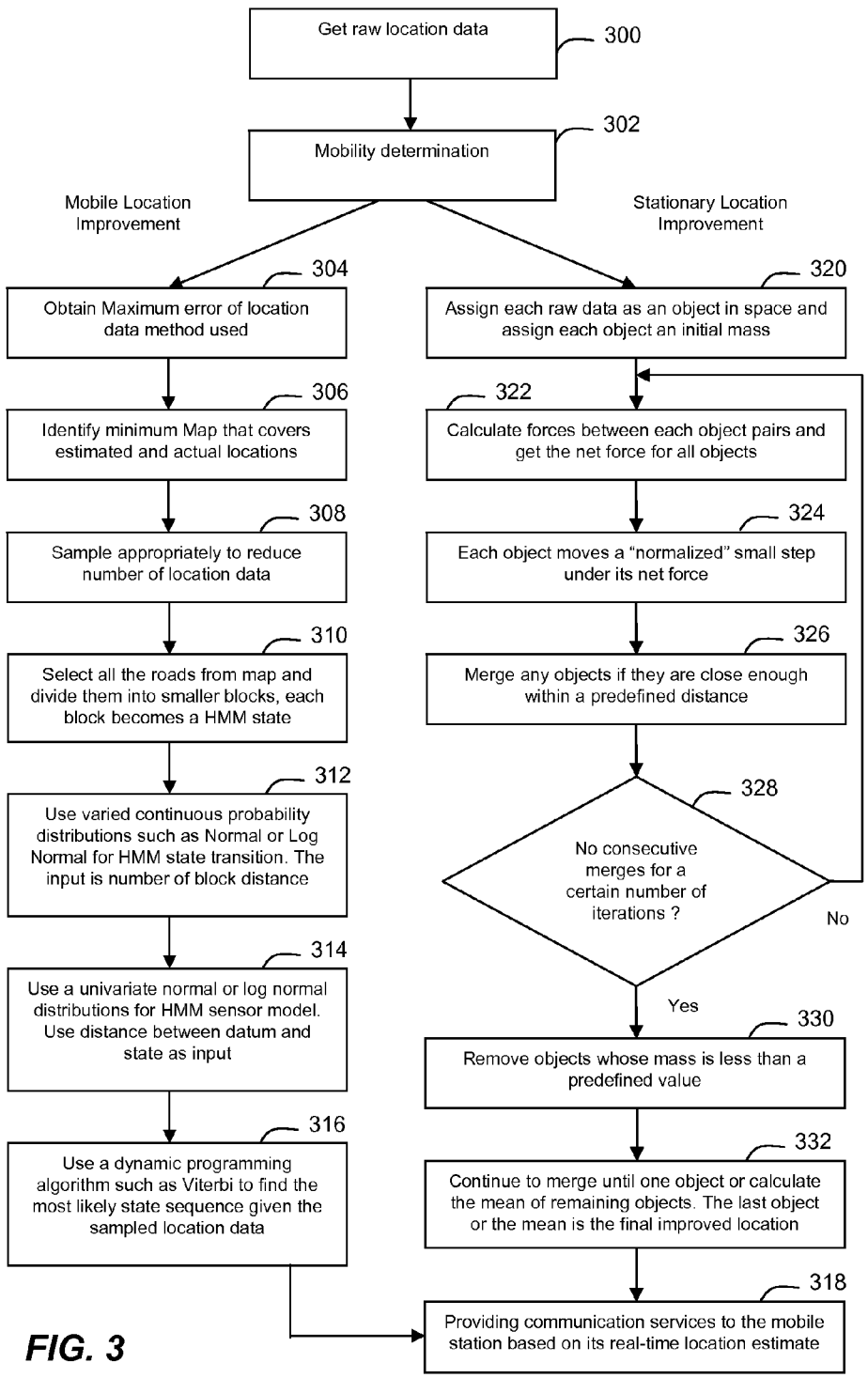
FIG. 3 is a flow chart of a method in accordance with the present invention.

Referring now to FIG. 3, a logic flow diagram is provided that illustrates a method for real-time location estimation of a mobile station in a wireless communication system on a geographic map of roads using non-Global Positioning Satellite (non-GPS) raw location data 300 of the mobile station and depending on a mobility status of the mobile station 302. If it is determined that the MS is in motion, the present invention implements a Mobile Location Improvement branch of the flow diagram, and if it is determined that the MS is stationary, the present invention implements a Stationary Location Improvement branch of the flow diagram.

The Mobile Location Improvement branch uses an improved fast Hidden Markov Model (HMM) to improve raw location estimates in real-time by a processor of the network entity as in the follow steps. In a next step 304, the processor obtains a maximum location estimation error $E_{max}$ of technique used to obtain the raw location data. For example, a particular location technique may give a maximum error of 1000 meters.

In a next step 306, the processor identifies a region on the map with a minimum area that covers all raw location estimates of a call session, and optionally the actual locations, that are guaranteed to be covered in this region.

In a next step 308, the processor reduces the total number of raw location data through sampling. If we let the region be a rectangle, this can be done, for example, by first getting the north-most, south-most, east-most and west-most raw location data and then adding Emax as boundary margin to extend the region, where the boundary margin has a width at least equal to $E_{max}$. The result is a larger rectangle that will cover all actual locations. The region can be further decreased if its shape is not limited to a rectangle, but this must be weighed against additional computational cost. In contrast, reducing the area of the region will reduce the number of HMM states. For example, FIG. 2 shows a sampling rate of eight from the original raw location data based on GSM Measurement Reports. Sampling appropriately can significantly reduce computational costs without sacrificing location improvement accuracy.

In a next step 310, the processor selects all the roads in the region and divides all the areas bordered by roads within the region into smaller blocks, and all these blocks constitute the states of HMM. Each block, for example, can be an N*N square. The size of block (N) is determined empirically by accuracy and computation requirements. The location of each block is represented by its geometric center. All the blocks on the roads of the region are then numbered from 1 to S (S being the total number of blocks).

In a next step 312, the processor determines a number of blocks between each block and all other blocks, and uses a varied continuous probability distribution such as Normal or Log-Normal as HMM state transition probability $P(S_t|S_{t-1})$ to avoid maintaining large discrete Conditional Probability Table in the memory. The state transition probability distributions vary with regions and time. In one embodiment, a Normal distribution is used for the probability distribution. Each area is associated with a state transition probability and it can be different from area-to-area and/or time-to-time. The state transition probability $P(S_t|S_{t-1})$ represents the likelihood that the MS moves from one state/block to another from a particular time period t−1 to t. In general, this probability is correlated to the traffic condition of the area and thus it varies with time and area. The mean and variance of the distribution are adjustable parameters, and a variable in the algorithm is the distance between two states/blocks, which is measured by number of blocks between them. In particular, the distance of two blocks/states can be obtained by a shortest path algorithm such as the Floyd-Warshall algorithm in a directed graph. In this way, road constraints such as one-way-only can be naturally incorporated into the distance calculation between two states. To reduce online computation costs, the shortest path between any two states can be pre-computed offline because roads are fixed.

In a next step 314, the processor uses a univariate continuous distribution as a function of a distance between each block and a raw location data. In practice, the univariate continuous distribution can be a Normal or Log-Normal distribution used as the HMM sensor model probability distribution $P(S_t|E_t)$ to avoid multivariate Gaussian computation. The sensor probability is a function of distance between raw location data and the center of a block. This distance is a physical Euclidian distance, i.e., $d=((X_1-X_2)^2+(Y_1-Y_2)^2)^{1/2}$.

The sensor probability represents how likely the state/block is, given a raw location data at a particular time t.

In a next step 316, the processor finds a most likely state/block sequence of the motion of the mobile station using the HMM state transition probability and the univariate continuous distribution as the location of the mobile station. In particular, the processor, uses a dynamic programming algorithm such as a Viterbi algorithm to find the mostly likely state/block sequence, given the state transition and sensor probability distributions, and the resultant sequence of blocks/states obtained are the improved real-time location estimates for the MS, in accordance with the present invention.

In a next step 318, the processor directs the transceiver to provide communication services to the MS based on its real-time location estimate. These location based services may be directions given to a subscriber on a display of the MS, local advertising of businesses on the road being traveled by the subscriber on a display of the MS, etc.

If the MS is stationary, we are dealing with a different type of problem from the above mobile situation, i.e., there is one expected location, but with multiple different raw location data. A straightforward approach is to use their mean as improved location. But a far distant location datum could significantly distort the mean. Accordingly, the Stationary Location Improvement branch of the present invention uses a novel move-and-merge method to remove outlying data and get a much better location result, as provided in the steps below. The process can be generally used for any data noise detection if this noise can be represented in a metric space.

In a next step 320, the processor assigns each raw location data as a data object in a metric space. In this case, it is a plane since location data is two dimensional. The processor also assigns each object an initial weight or "mass" value, such as 1.

In a next step 322, the processor calculates the net attractive force for all data using a distance between the data. In particular, the distance between any two objects i,j is defined as a Euclidean distance, i.e., $d_{i,j}=((X_i-X_j)^2+(Y_i-Y_j)^2)^{1/2}$, and the "force" at i caused by j is defined as $f_{i,j}=(G \cdot mass_i \cdot mass_j)/d_{i,j}^2$ where (i≠j), and where G is a constant determined empirically by accuracy and speed requirements. Note that $f_{i,j}$ is a vector and its direction is from i to j. The net force at i caused by all other data objects is:

$$F_i = \sum_{i=1}^{n} f_{i,j}$$

where (i≠j). The processor calculates all the forces $F_i$(i=1 . . . n).

In a next step 324, the processor moves each datum a normalized step on the map in response to the net attractive force. Under force $F_i$, an object i moves a "normalized" small step. The direction of the move is the same as $F_i$ and the magnitude is obtained as follows: calculate $\Delta L_i=F_i/m_i$ and let the maximum $\Delta L_i$ be MAX($\Delta L$). Then, normalized move $N(L_i)=[\Delta L_i/MAX(\Delta L)]*L_c$, where $L_c$ is a predefined constant specifying the maximum distance a move can happen. The processor then updates the new location $L_i=L_i+N(L_i)$ in memory. This "normalized" move guarantees that the largest move for each iteration is constant and thus the time needed to complete the entire process can be controlled by adjusting $L_c$, which is critical for real time system.

In a next step 326, the processor merges any data that are within a predefined distance on the map and adds their masses (see FIG. 7). In particular, the processor checks if there are two objects close enough after the above step 324 ($d_{i,j}$<r, where r is a predefined parameter determined empirically by accuracy and speed requirements). If the objects are close enough, the processor will merge the two objects into one larger object k and the new mass is $m_k=m_i+m_j$ and new location is weighted average of $L_i$ and $L_j$. Multiple merges within same iteration are allowed to significantly save computation time because it reduces the number of remaining objects quickly.

In step 328, steps 322-326 are repeated until there are no consecutive merges in step 326 for a predetermined number of iterations, which means remaining objects are well separated. The predetermined number of iterations is determined empirically by accuracy and speed requirements.

In step 330, the processor then examines the mass of the remaining objects and removes any data objects whose mass is smaller than a threshold value $m_p$, which is determined empirically by accuracy and speed requirements.

In step 332, if there is more than one merged datum left, and the total number of iterations is less than a predefined number, the processor to step 322. Otherwise, the processor uses the mean of the locations of any remaining data as the final real-time location estimate of the mobile station.

In a next step 318, the processor directs the transceiver to provide communication services to the MS based on its real-time location estimate. These location based services may be directions given to a subscriber on a display of the MS, local advertising of businesses on the road being traveled by the subscriber on a display of the MS, etc.

EXAMPLE

Figure 4:
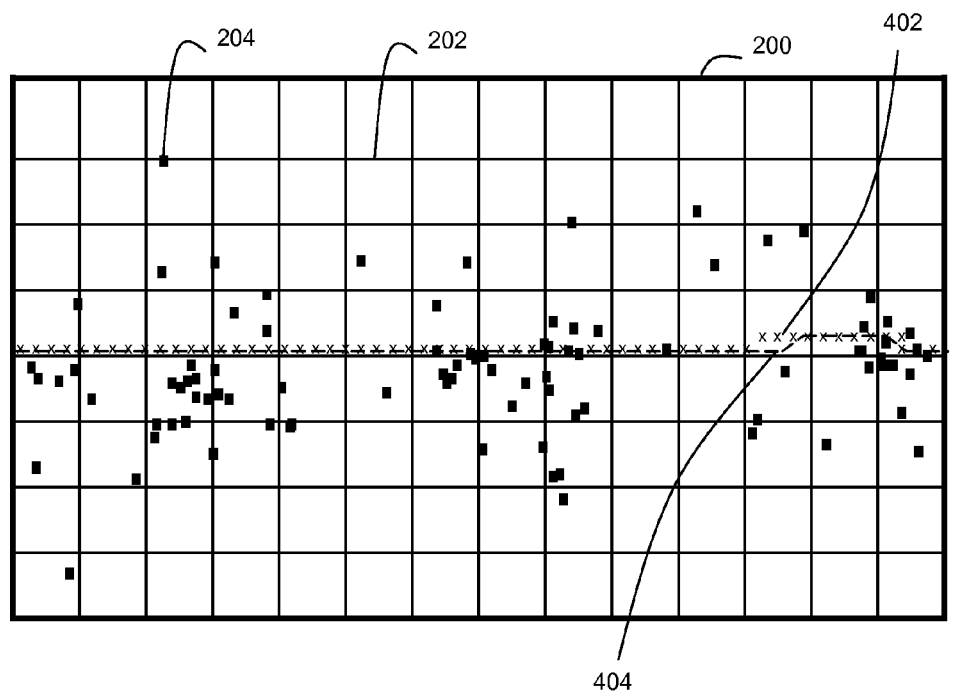
FIG. 4 is the block diagram of FIG. 1, with location measurements using a GPS system and a system in accordance with the present invention.
Figure 5:
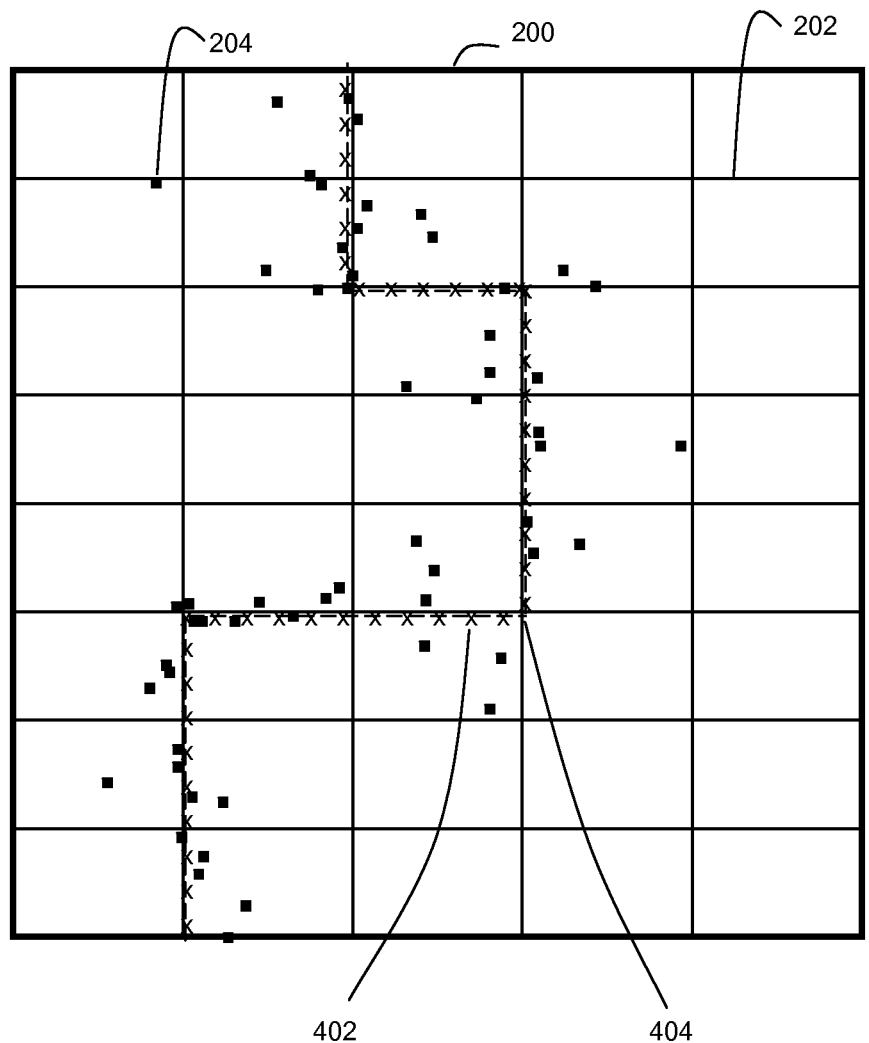
FIG. 5 is a graphical representation of a geographic map of roads and prior art location estimates of a moving MS on a second route, along with location measurements using a GPS system and a system in accordance with the present invention.

FIGS. 4 and 5 show two experimental results when an MS is moving, in accordance with the present invention. Again as in FIG. 2, the grid 200 of FIG. 4 represents a geographical map of roads 202 with the MS moving linearly from left to right in the middle of the grid. The grid is overlain with raw non-GPS location data 204 of a moving MS. For comparison purposes, actual movement locations of the MS were measured by GPS, and are shown as "x" 402. The improved HMM technique 404 of the present invention, shown as the dashed line 404, achieved significant results, overlapping with actual GPS locations in almost all instances. Advantageously, these computations can be done in real time, and this technique works well for complicated routes, as shown in FIG. 5. In FIG. 5 the grid 200 of FIG. 4 represents a geographical map of roads 202 with the MS changing directions while moving. The grid is overlain with raw non-GPS location data 204 of the moving MS. For comparison purposes, actual movement locations of the MS were measured by GPS, and are shown as "x" 402. The improved HMM technique 404 of the present invention, shown as the dashed line 404, achieved significant results, overlapping with actual GPS locations in all instances.

Figure 6:
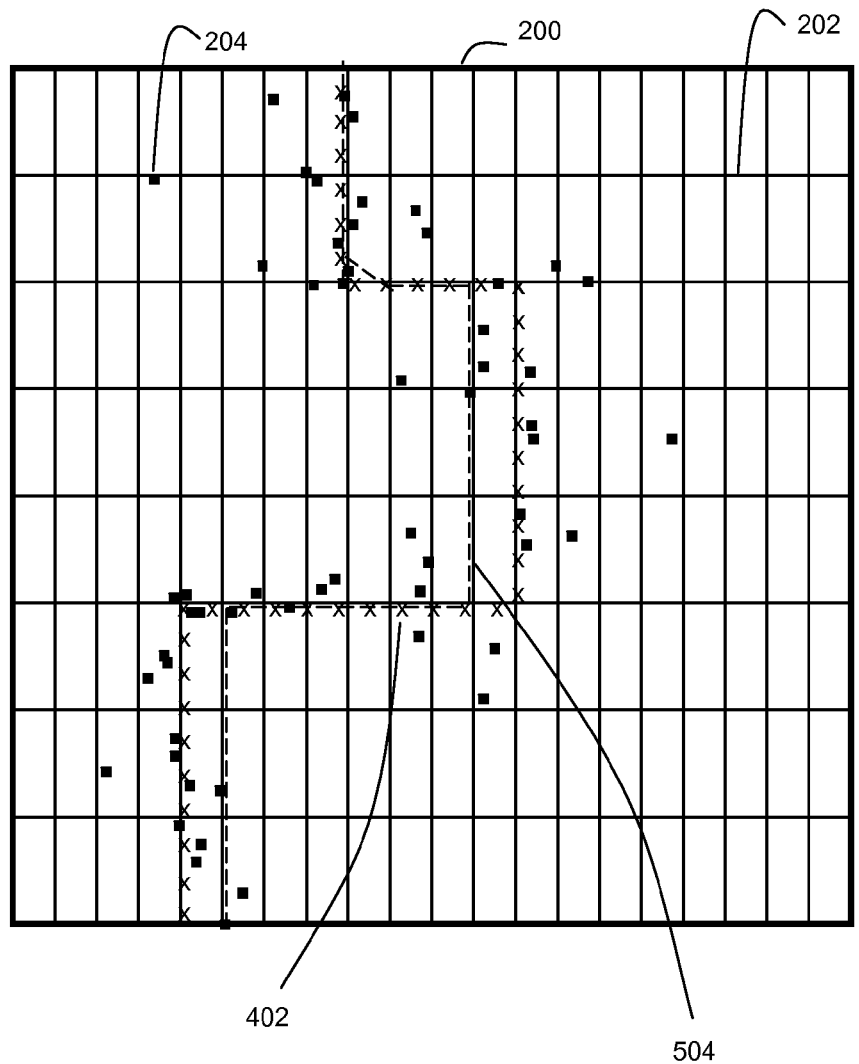
FIG. 6 is an alternative version of FIG. 5.

FIG. 6 shows the result of a full state HMM embodiment of FIG. 5 that has to divide all areas into blocks/states because it does not employ a mobility determination to limit the choice of states on the road. Not only does this embodiment take much more time to compute, the result is also not as accurate as FIG. 5 due to interference of unnecessary states. In particular, this test used 861 states versus the 105 states of FIG. 5. As a result, the computation is $(861/105)^2=67$ times slower, and accuracy is actually compromised over the preferred embodiment demonstrated in FIG. 5 as shown, where the full state HMM 504 no longer overlaps the actual GPS data 402 well.

Figure 7A:
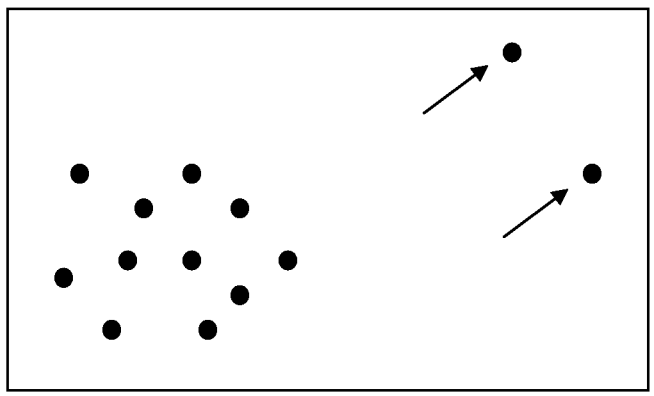
FIGS. 7A-D is a graphical representation of a map location estimate of a stationary MS in accordance with the present invention.
Figure 7B:
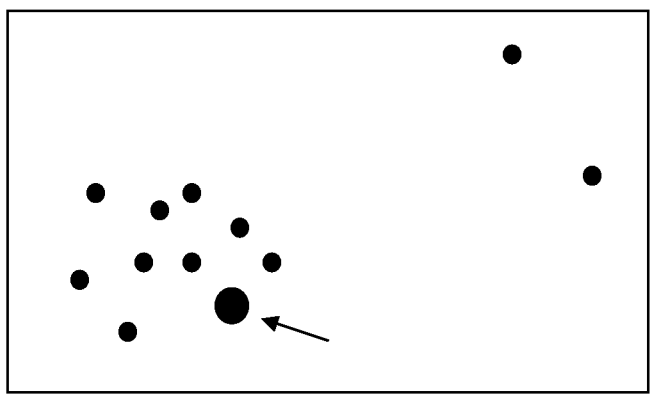
Figure 7C:
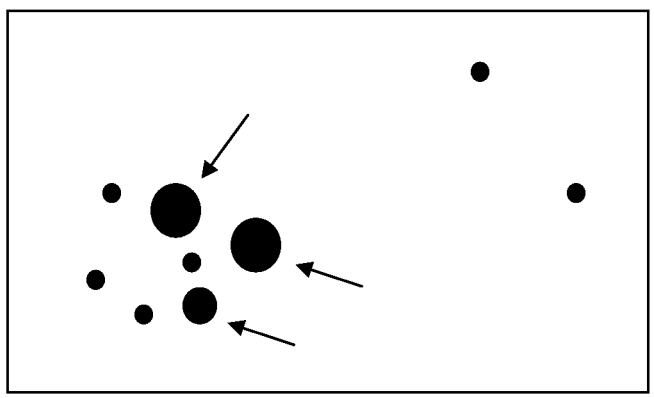
Figure 7D:
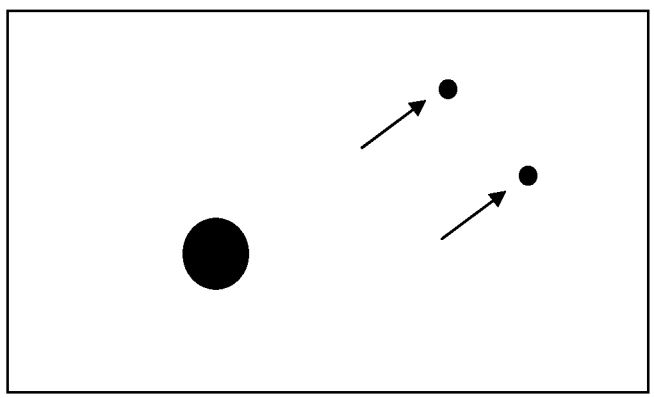

FIGS. 7A-D shows how move-and-merge works when MT is stationary (as demonstrated in steps 322-332 of FIG. 3). The arrows in FIGS. 7A and 7D point to outlying data to be removed because they have less chance to merge and their final "mass" (represented as their size) is small. The arrows in FIGS. 7B and 7C point to merged objects, the increased size representing the increased "mass" of the data objects. FIG. 7D shows that when the move-and-merge process terminates, the mass of the two outlying data remains at 1, and they are identified and removed. In operation, FIG. 7A shows an initial position. FIG. 7B shows the first merge after a few (iterative) moves. FIG. 7C shows the positions and merges after several moves. FIG. 7D shows the final position with outlying data identified for removal leaving the single merged object as the real-time location estimate of the stationary MS. In all, the present invention shows a 36% improvement over prior non-GPS location solutions.

Advantageously, the present invention provides a robust and improved infrastructure-based, real-time location determination that does not require a specific location of an MS and that may be implemented in a communication system infrastructure without the need to add new hardware to the infrastructure. An added benefit of the present invention is that there is no additional power consumption for the MS because all location improvements are done in the network entity.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

The sequences and methods shown and described herein can be carried out in a different order than those described. The particular sequences, functions, and operations depicted in the drawings are merely illustrative of one or more embodiments of the invention, and other implementations will be apparent to those of ordinary skill in the art. The drawings are intended to illustrate various implementations of the invention that can be understood and appropriately carried out by those of ordinary skill in the art. Any arrangement, which is calculated to achieve the same purpose, may be substituted for the specific embodiments shown.

The invention can be implemented in any suitable form including hardware, software, firmware or any combination of these. The invention may optionally be implemented partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate.

Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

What is claimed is:

1. A method for real-time location estimation of a mobile station in a wireless communication system on a geographic map of roads using non-Global Positioning Satellite (non-GPS) raw location data of the mobile station and depending on a mobility status of the mobile station, the method comprising the steps of:
    determining that the mobile station is in motion, whereupon:
        identifying a region on the map with a minimum area that covers all raw location data;
        dividing all the areas bordered by roads within the region into smaller blocks, wherein each block constitute a Hidden Markov Model (HMM) state;
        for each block, determining a number of blocks between that block and all other blocks, and using the number of blocks in a varied continuous probability distribution to determining a HMM state transition probability of each block to represent a likelihood of the mobile station moving from one block to another;
        using a univariate continuous distribution as a function of a distance between each block and a raw location data; and
        finding a most likely state/block sequence of the motion of the mobile station using the HMM state transition probability and the univariate continuous distribution as the location of the mobile station.

2. The method of claim 1, further comprising the step of reducing the total number of raw location data through sampling.

3. The method of claim 1, further comprising the steps of:
    obtaining a maximum location estimation error; and
    extending the region with an added boundary margin, wherein the margin has a width at least equal to the maximum location estimation error.

4. The method of claim 1, wherein the HMM state transition probability is correlated to a traffic condition within the region.

5. The method of claim 1, wherein the varied continuous probability distribution and univariate continuous distribution are defined for a particular time period.

6. The method of claim 1, wherein the finding step uses a Viterbi algorithm, the using step uses a Euclidian distance, and the determining the number of blocks step uses a shortest path algorithm and one of a Normal and log-Normal varied continuous probability distribution.

7. The method of claim 1, wherein the distances are taken from a geometric center of each block.

8. The method of claim 1, further comprising the steps of:
   determining that the mobile station is stationary; whereupon:
   assigning each raw location datum with an initial mass such that the data exhibit an attractive force therebetween;
   calculating the net attractive force for all data using a distance between the data;
   moving each datum a normalized step on the map in response to the net attractive force;
   merging any data that are within a predefined distance on the map and adding their masses;
   repeating the calculating, moving, and merging steps until there are no consecutive merges for a predetermined number of iterations; and
   removing any datum with a mass less than a threshold, wherein;
   if there is more than one merged datum left, and the total number of iterations is less than a predefined number, going to the calculating step, otherwise using the mean of the locations of any remaining data as the location of the mobile station.

9. The method of claim 1, wherein in the calculating step the net force at i by all other data is calculated using:

$$f_{i,j} = (G \cdot mass_i \cdot mass_j)/d_{i,j}^2 \text{ and}$$

$$netforce_i = \sum_{i=1}^{n} f_{i,j} \text{ where } (i \neq j)$$

where G is a constant and d is the Euclidean distance between data points.

10. The method of claim 1, wherein in the moving step the normalized step is in the same direction as the net force and the magnitude of the normalized step is:

$$N(L_i) = [(netforce_i/mass_i)/\max(netforce_i/mass_i)] * L_c$$

where $L_c$ is a constant specifying the maximum distance a move can happen.

11. The method of claim 1, wherein in the dividing step, the block size and shape can vary.

12. A network entity that estimates a real-time location of a mobile station in a wireless communication system on a geographic map of roads using non-Global Positioning Satellite (non-GPS) raw location data of the mobile station and depending on a mobility status of the mobile station, the network entity comprising:
   a transceiver for communicating with the mobile device;
   a memory; and
   a processor coupled with the transceiver and memory, the processor operable to:
   determine that the mobile station is in motion, whereupon the processor identifies a region on the map with a minimum area that covers all raw location data;
   divide all the areas bordered by roads within the region into smaller blocks, where each block constitutes a Hidden Markov Model (HMM) state;
   for each block, determine a number of blocks between that block and all other blocks, and using the number of blocks in a varied continuous probability distribution to determining a HMM state transition probability of each block to represent a likelihood of the mobile station moving from one block to another;
   use a univariate continuous distribution as a function of a distance between each block and a raw location data; and
   find a most likely state/block sequence of the motion of the mobile station using the HMM state transition probability and the univariate continuous distribution as the location of the mobile station.

* * * * *